Figure 1:
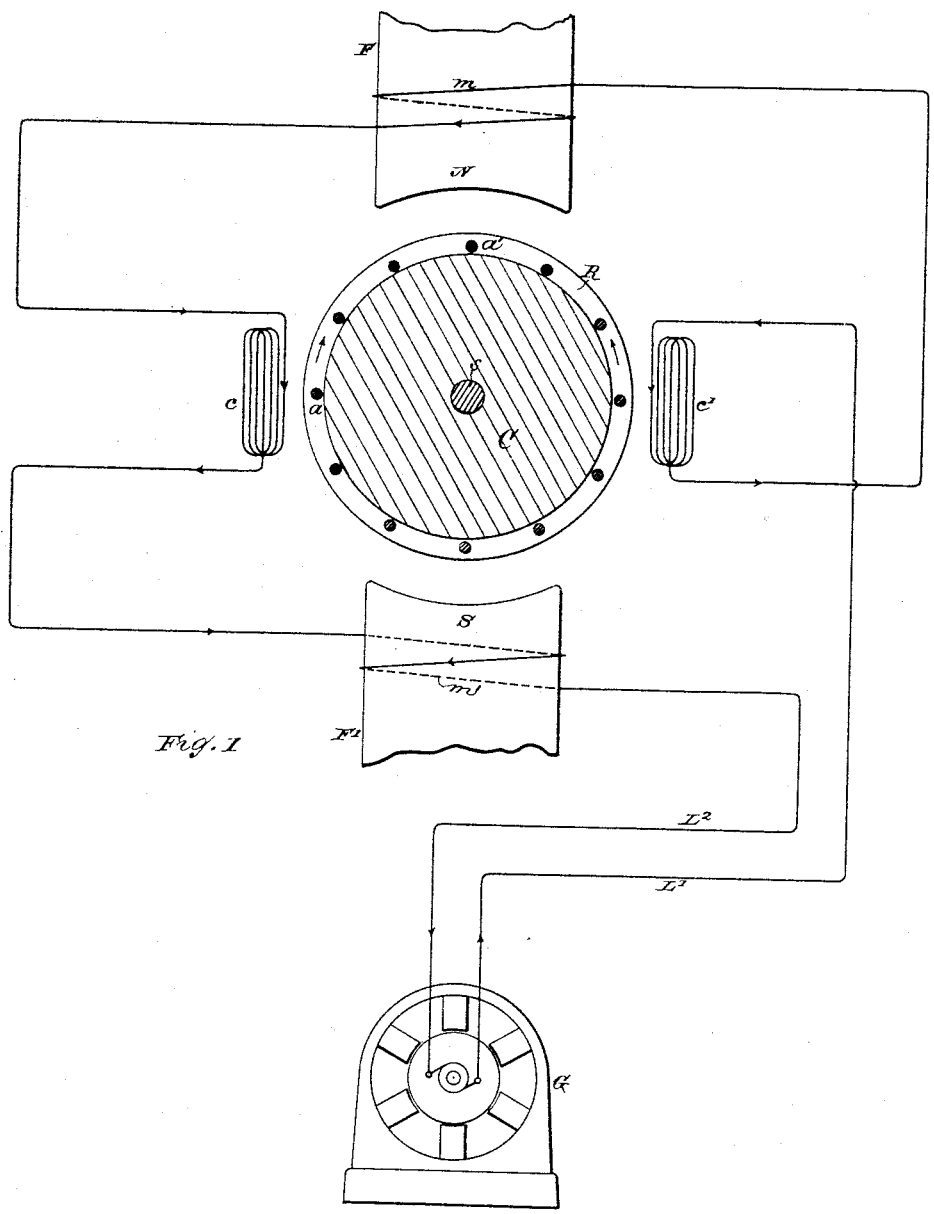

(No Model.)

W. STANLEY, Jr.
ELECTRICAL TRANSMISSION OF POWER.

No. 439,042. Patented Oct. 21, 1890.

Fig. I

Witnesses:
Raphaël Netter
F. H. Bromell

Inventor
William Stanley Jr.
By
Clarkson A. Collins
Attorney.

(No Model.)  3 Sheets—Sheet 2.

W. STANLEY, Jr.
ELECTRICAL TRANSMISSION OF POWER.

No. 439,042. Patented Oct. 21, 1890.

Witnesses:
Raphaël Netter
F. H. Brownell

Inventor
William Stanley Jr.
By
Clarkson A. Collins
Attorney.

(No Model.)
W. STANLEY, Jr.
ELECTRICAL TRANSMISSION OF POWER.
No. 439,042.  3 Sheets—Sheet 3.
Patented Oct. 21, 1890.
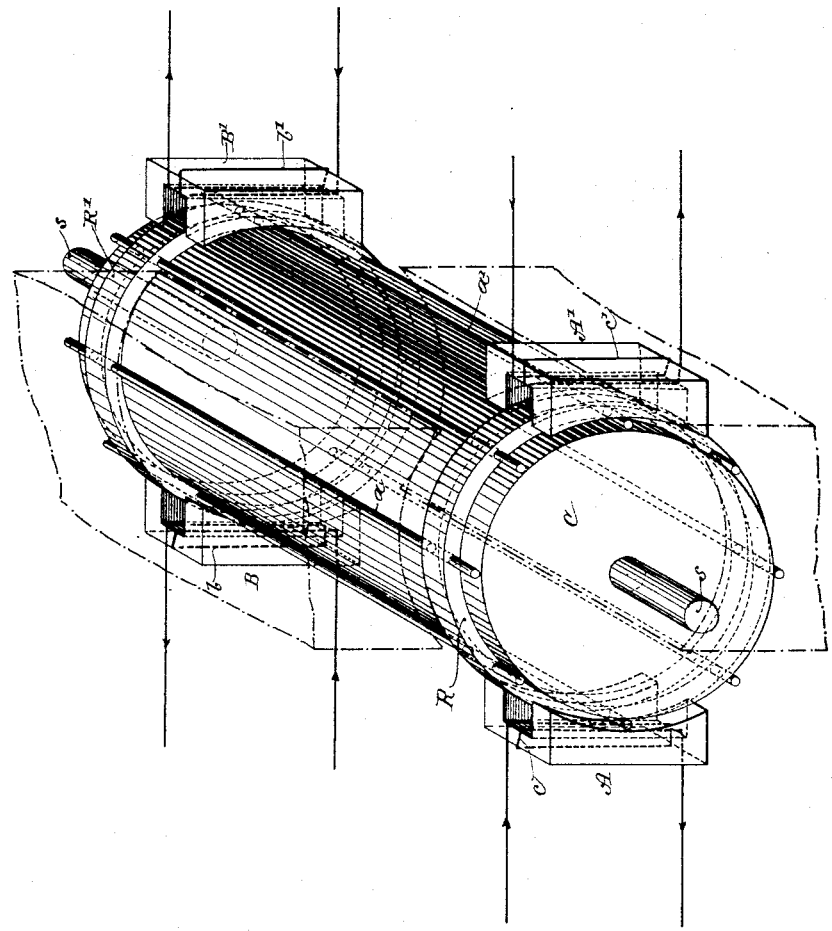

UNITED STATES PATENT OFFICE.

WILLIAM STANLEY, JR., OF GREAT BARRINGTON, MASSACHUSETTS, ASSIGNOR TO THE WESTINGHOUSE ELECTRIC AND MANUFACTURING COMPANY, OF PITTSBURG, PENNSYLVANIA.

ELECTRICAL TRANSMISSION OF POWER.

SPECIFICATION forming part of Letters Patent No. 439,042, dated October 21, 1890.

Application filed June 12, 1889. Serial No. 314,006. (No model.)

*To all whom it may concern:*

Be it known that I, WILLIAM STANLEY, Jr., a citizen of the United States, residing in Great Barrington, in the county of Berkshire and State of Massachusetts, have invented certain new and useful Improvements in the Electrical Transmission of Power, (Case No. 126,) of which the following is a specification.

My invention relates to the operation of electric motors by means of alternating electric currents transmitted from a suitable source of electricity. In the most available system hitherto devised in which alternating electric currents are utilized for the production of mechanical energy the movable member of an electric motor is caused to rotate by means of a continuously progressive shifting or rotation of the poles developed in one or both members of the motor by the current, a given pole being continuously transferred or shifted without change of sign from point to point throughout a metallic core in which it appears.

In my invention, on the contrary, the poles inductively developed in one of the members of the motor by means of alternating currents always appear upon a line which occupies an approximately fixed position in space and a given pole is in no sense transferred or shifted through the core of such member, but disappears and is succeeded by a pole of the opposite sign, which in turn is followed by a pole of the same sign as before, and so on, the alternations of polarity being synchronous with alternations of polarity in the other member of the motor, and the two lines of polarization being so related in position as to produce rotation of the movable member.

By means of my invention I provide a motor which will operate with slight variations of speed consequent upon changes in load, and at the same time I obviate the necessity of employing numerous conducting-wires leading from the generator and secure all the advantages of using an alternating electric current of high tension for the operation of electric motors without the use of a commutator.

In carrying the invention into effect a field of force of alternating polarity, within which lie the armature-conductors of the motor, is developed by means of current from a suitable source of alternating electric currents. Alternating currents are thus inductively developed in those armature-conductors which occupy positions of inductive effect in such field of force, and are caused to flow thence through those conductors or coils upon the armature which at the moment are in such positions that if the armature were at rest no current would be developed in them by the field of force. As a consequence of the flow of current in such conductors, resultant poles developed in the armature-core will appear upon a line maintaining an approximately-constant position in space and forming an angle with that upon which lie the poles of the field-magnets, or, in other words, the armature will be subject to two lines of polarization constant in position and lying at an angle to one another, and the mutual attraction and repulsion of the poles will cause an active and continuous rotation of that element of the motor which is free to revolve.

The invention will be best understood by reference to the accompanying drawings, in which—

Figure 2:
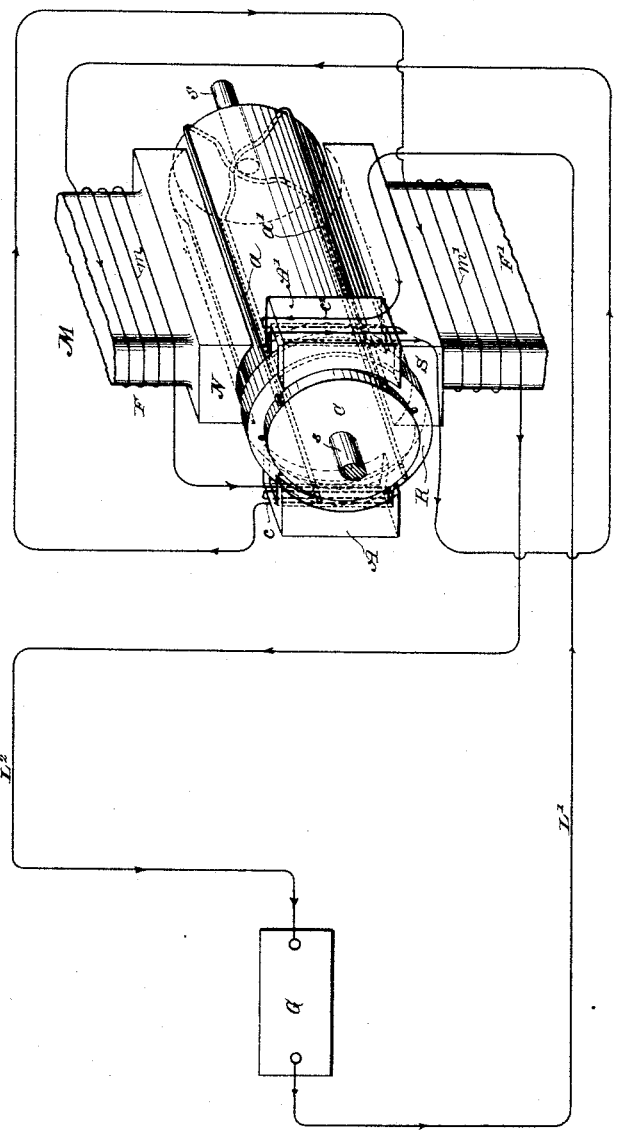

Figure 1 is a diagram showing the circuit-connections, and Fig. 2 is a view in perspective of a motor constructed to operate in accordance with the invention.

Referring to the drawings, G represents a generator of alternating electric currents, which may be of any well-known form, and from which lead main conductors $L'$ $L^2$. Between the mains $L'$ $L^2$ are connected the coils $m$ $m'$ of the field-magnets F F' of the motor M.

$a$ $a'$ $a''$, &c., are the armature-conductors, mounted upon a laminated iron core C, which is carried upon the shaft S. The armature-conductors may be in the form of coils of wire, or preferably, as shown in the drawings, they may consist of copper bars extending longitudinally along the armature-core, thence diametrically across the end of the core, and back along the core in a direction parallel to the first course. The terminals of each of the armature-conductors are connected to a conductor R, consisting in the present instance of a ring or band of copper mounted upon the core C and insulated therefrom, as are also the armature-conductors. At diametrically-opposite points of the ring R and upon a line approximately at right angles with the magnetic axis of the field-magnets F F' are located iron cores A A', which partially embrace the ring R. They are wound, respectively, with coils $c\,c'$, which are connected with the mains $L'\,L^2$, leading from the generator G, either in series with the field-magnet coils $m\,m'$, as shown in the drawings, or, if desired, in a circuit or circuits in parallel therewith. The coils $c\,c'$ are wound in such directions that when current from a source of alternating electric currents is passed through them the resulting fields of alternating polarity acting upon the ring R will develop therein opposing electro-motive forces, as indicated by the arrows, which, owing to the position of the coils $c\,c'$, will operate to drive current through the ring R toward these armature-conductors, which when the armature is at rest are not inductively acted upon by the field of force developed by the current in the field-magnet coils.

The method of operation of the apparatus is as follows: Considering the armature in a state of rest, alternating electric currents from the generator G are caused to traverse the field-magnet coils $m\,m'$ and also the coils $c\,c'$. A line of polarization of alternating polarity is established by the currents flowing in the field-magnet coils, and at the same time alternating currents are inductively developed in those armature-conductors, as $a$, which occupy positions of inductive effect. The currents thus inductively developed enter the ring R and are carried along the ring R to and through those armature-conductors, as $a'$, which at the moment are not in positions of inductive effect. Thus a second line of polarization is developed in the armature-core, which lies at an angle to the line of polarization due to the current flowing in the field-magnet coils. If current were flowing only in those armature-coils, as $a$, which occupy positions of inductive effect, the line of polarization established thereby would coincide in position with that due to the current in the field-magnet coils and the armature would remain at rest. The flow of current, however, in those armature-coils, as $a'$, which are not in positions of inductive effect will cause the line of polarization due to the induced currents to lie at an angle with that due to the currents in the field-magnet coils.

The poles in the armature-core will alternate synchronously with those of the field-magnets, and since the armature is subjected to the influence of two lines of polarization lying at an angle with one another rotation will result.

It is evident that as the armature revolves electro-motive force proportioned to the speed of revolution will be set up in those armature-conductors which are being carried across the lines of force. This will not affect the principle of operation, but will tend to reduce the flow of current inductively developed by the alternations of polarity in the field of force and will result in greater economy in the operation of the machine.

In Fig. 3 of the drawings a slightly-modified form of the apparatus is shown, the armature-conductors extending only across the core longitudinally and being connected at their extremities by two copper bands R and R'. The second ring R' is subjected to the inductive action of two coils $b\,b'$, wound upon cores B B', constructed and located in the same manner as the cores A A'. The coils $b\,b'$ are also wound and connected in circuit in the same manner as the coils $c\,c'$. The method of operation is the same as already described.

The advantages of my invention will be evident to those skilled in the art, as by means of it an alternating electric current of high tension may be economically employed in the operation of electric motors and with but a single pair of mains leading from the generator, while the apparatus is simple and economical in construction.

I have not attempted to describe herein all possible means of carrying my invention into effect, but only the best form of apparatus for the purpose now known to me, various modifications of which will readily occur to those skilled in the art.

What I do claim as new, and desire to secure by Letters Patent, is—

1. The hereinbefore-described method of transmitting power by alternating electric currents, which consists in establishing a field of force of alternating polarity embracing a rotatable armature by means of such currents, setting up in a conductor electrically connecting the armature-coils two opposing electro-motive forces by means of currents alternating synchronously with the first-mentioned currents, and thereby causing currents inductively developed in those armature-coils which occupy positions of inductive effect in such field of force to traverse those armature-coils which are not inductively affected when the armature is at rest.

2. In an alternate-current electric motor, the combination of a core, armature-conductors mounted thereon, a conductor electrically connecting the armature-conductors, and means for developing opposing electro-motive forces in such connecting-conductor, substantially as and for the purposes set forth.

3. In an alternate-current electric motor, the combination of armature-conductors, a separate conductor electrically connecting the armature-conductors, and coils located adjacent to such separate conductor and operating to develop therein electro-motive forces opposed in direction, substantially as and for the purposes set forth.

In testimony whereof I have hereunto subscribed my name this 24th day of May, A. D. 1889.

WILLIAM STANLEY, Jr.

Witnesses:
 WM. J. DAVIS,
 LEWIS S. JENKINS.